US012559592B2

(12) United States Patent
Kalgutkar et al.

(10) Patent No.: US 12,559,592 B2
(45) Date of Patent: Feb. 24, 2026

(54) BRANCHED AMORPHOUS POLYAMIDE (CO)POLYMERS AND METHODS OF MAKING AND USING SAME

(71) Applicant: 3M INNOVATIVE PROPERTIES COMPANY, St. Paul, MN (US)

(72) Inventors: Rajdeep S. Kalgutkar, Woodbury, MN (US); David T. Amos, St. Paul, MN (US); Ignatius A. Kadoma, Cottage Grove, MN (US); Joseph A Severance, Lake Elmo, MN (US); Jilliann M. Nelson, Maplewood, MN (US); Annabelle Watts, Minneapolis, MN (US); Jonathan J. Anderson, New Brighton, MN (US); Kimberly C. M. Schultz, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 637 days.

(21) Appl. No.: 17/995,867

(22) PCT Filed: Apr. 13, 2021

(86) PCT No.: PCT/IB2021/053039
§ 371 (c)(1),
(2) Date: Oct. 10, 2022

(87) PCT Pub. No.: WO2021/209895
PCT Pub. Date: Oct. 21, 2021

(65) Prior Publication Data
US 2023/0167243 A1 Jun. 1, 2023

Related U.S. Application Data

(60) Provisional application No. 63/010,496, filed on Apr. 15, 2020.

(51) Int. Cl.
| | |
|---|---|
| *C08G 73/12* | (2006.01) |
| *C08G 73/10* | (2006.01) |
| *C09J 7/10* | (2018.01) |
| *C09J 7/38* | (2018.01) |
| *C09J 11/08* | (2006.01) |

(52) U.S. Cl.
CPC ....... *C08G 73/122* (2013.01); *C08G 73/1042* (2013.01); *C09J 7/10* (2018.01); *C09J 7/38* (2018.01); *C09J 11/08* (2013.01); *C09J 2301/408* (2020.08); *C09J 2301/414* (2020.08); *C09J 2477/00* (2013.01); *C09J 2479/08* (2013.01); *C09J 2493/00* (2013.01)

(58) Field of Classification Search
CPC .................................. C08G 69/02; C09J 7/38
See application file for complete search history.

(56) References Cited

U.S. PATENT DOCUMENTS

| | | | |
|---|---|---|---|
| 3,377,303 | A | 4/1968 | Peerman et al. |
| 3,462,284 | A | 8/1969 | Vertnik |
| 3,802,817 | A | 4/1974 | Matsuki et al. |
| 4,218,351 | A | 8/1980 | Rasmussen |
| 4,739,019 | A | 4/1988 | Schappert |
| 4,810,772 | A | 3/1989 | Leoni |
| 5,795,834 | A | 8/1998 | Deeb et al. |
| 6,117,024 | A | 9/2000 | Dewanjee |
| 7,459,489 | B2 | 12/2008 | Lewandowski et al. |
| 9,527,961 | B2 | 12/2016 | Erdodi et al. |
| 9,988,555 | B2 | 6/2018 | Erdodi et al. |
| 2004/0220378 | A1 | 11/2004 | Kuntimaddi |
| 2005/0272900 | A1 | 12/2005 | Kuntimaddi et al. |
| 2018/0305544 | A1 | 10/2018 | Perez et al. |
| 2018/0327638 | A1 | 11/2018 | Emslander et al. |

FOREIGN PATENT DOCUMENTS

| | | |
|---|---|---|
| CN | 104592930 B | 2/2017 |
| EP | 0210812 B1 | 1/1991 |
| EP | 0180148 B1 | 3/1991 |

OTHER PUBLICATIONS

"Adipic Acid", Wikipedia, URL:<https://en.wikipedia.org/w/index.php?title=Adipic_acid&oldid=880858841>, retrieved from entirety of document, 2019, pp. 1-5.
"Polymer", Wikipedia, URL:<https://en.wikipedia.org/w/index.php?title=Polymer&oldid=930650921>, retrieved from entirety of document, 2019, pp. 1-14.
International Search Report for PCT International Application No. PCT/IB2021/053039, mailed on Jul. 9, 2021, 3 pages.
Extended European Search Report for EP Application No. 21789196.9, mailed on May 10, 2024, 3 pages.

*Primary Examiner* — Wenwen Cai

(57) ABSTRACT

Branched amorphous polyamide (co)polymers having a backbone formed by reacting a reaction mixture including at least 25 mol % of a di-amine selected from a secondary di-amine, a branched di-amine, or a combination thereof; and an aliphatic acid blend including a branched aliphatic dimer acid and a branched aliphatic trimer acid. The molar equivalent ratio of the di¬ amine to the aliphatic acid blend is 0.9-1.1. Preferably, the branched amorphous polyamide (co)polymer is not telechelic. The branched amorphous polyamide (co)polymer preferably exhibits one or more of a shear modulus of from 10,000 to 500,000 Pa at 70° C., a complex viscosity of greater than 1,000,000 mPa*s at 70° C., a glass transition temperature of less than 25° C., or a number average molecular weight of greater than 10,000 Da. Biodegradable and/or compostable adhesive articles including the branched amorphous polyamide (co)polymer also are disclosed.

15 Claims, No Drawings

BRANCHED AMORPHOUS POLYAMIDE (CO)POLYMERS AND METHODS OF MAKING AND USING SAME

CROSS REFERENCE TO RELATED APPLICATIONS

This application is a national stage filing under 35 U.S.C. 371 of PCT/IB2021/053039, filed Apr. 13, 2021, which claims the benefit of U.S. Provisional Patent Application No. 63/010,496, filed Apr. 15, 2020, the disclosure of which is incorporated by reference in its/their entirety herein.

TECHNICAL FIELD

The present disclosure relates to branched amorphous polyamide (co)polymers and related methods of making and using branched amorphous polyamide (co)polymers as pressure sensitive adhesives.

BACKGROUND

Polyamide (co)polymers are generally known as tough, engineering grade thermoplastic materials. Examples of such materials include semi-crystalline polyamide (co)polymers with common names such as Nylon 6, Nylon 6,6, Nylon 12, and the like. Another class of crystalline or semi-crystalline polyamide (co)polymers made from dimer acids is known to be useful as hot melt adhesives. Examples of such polyamide (co)polymers are sold under the trade names UNI-REZ™ and TECHNOMELT™ by Kraton (Houston, TX) and Henkel (Rocky Hill, CT), respectively. These crystalline or semi-crystalline polyamide (co)polymers are hard, non-tacky materials generally defined as having a shear storage modulus greater than >1 MPa at room temperature (25° C.). Such crystalline or semi-crystalline polyamide (co)polymers generally do not perform as pressure sensitive adhesives at or below 50° C.

SUMMARY

We have discovered a class of branched amorphous polyamide (co)polymers that perform as pressure sensitive adhesives (PSA) at or below 50° C. Through careful choice of the di-acid and di-amine monomers used as reactants to produce the amorphous polyamide (co)polymers, it is possible to prepare amorphous polyamide (co)polymers that are self-cohesive and which may be used as PSA's at or below 50° C.

Without wishing to be bound by any particular theory, we believe that the self-cohesiveness of these inventive polyamide (co)polymers relates to their inherent ability to hydrogen bond with polar surfaces or even other branched amorphous polyamide (co)polymers while remaining amorphous, in contrast to the hydrogen bonding induced crystallization which occurs in the known semi-crystalline or crystalline polyamide (co)polymers made from dimer acids known to be useful as a hot melt adhesives, particularly the Nylon (co)polymers.

Thus, in one aspect, the present disclosure describes branched amorphous polyamide (co)polymers having a backbone formed by reacting a reaction mixture including at least 25 mol % of a di-amine selected from a secondary di-amine, a branched di-amine, or a combination thereof, and an aliphatic acid blend including a branched aliphatic di-acid and a branched aliphatic tri-acid. The molar equivalent ratio of the di-amine to the aliphatic acid blend is 0.9-1.1.

Preferably, the branched amorphous polyamide (co)polymer is not telechelic. The branched amorphous polyamide (co)polymer preferably exhibits one or more of a shear modulus of from 10,000 to 500,000 Pa at 25° C., a complex viscosity of greater than 1,000,000 mPa*s at 70° C., a glass transition temperature of less than 25° C., or a number average molecular weight of greater than 10,000 Da. Biodegradable and/or compostable adhesive articles including the branched amorphous polyamide (co)polymer also are disclosed.

In another aspect, compostable adhesive articles including the branched amorphous polyamide (co)polymer also are disclosed.

Various unexpected results and advantages are obtained in exemplary embodiments of the disclosure. One such advantage of some exemplary embodiments of the present disclosure is that the amorphous polyamide (co)polymers, while they may be non-tacky at temperatures at or below 50° C., nevertheless are self-cohesive and perform well as pressure sensitive adhesives at or below 50° C.

Furthermore, in some exemplary embodiments, the branched amorphous polyamide (co)polymer may be used in a PSA composition including a high percentage of renewable or biobased content, generally from 70-100%. In further exemplary embodiments, the PSA composition may be prepared and processed into adhesive articles without the use of organic solvents. Furthermore, in additional exemplary embodiments, the PSA will exhibit a low probability of skin or respiratory sensitization due to the inherently low levels of residual volatile organic compounds or monomers.

In some exemplary embodiments, the PSA may adhere well to nonpolar substrates, such as synthetic rubber based elastic films (e.g., styrene-isoprene-styrene (SIS) or styrene-butadiene-styrene (SBS) copolymer films).

In additional exemplary embodiments, the PSA may exhibit strong adhesion to polar substrates, and may even adhere well to non-polar substrates such as polytetrafluoroethylene (PTFE) films The inventive polyamide (co)polymers can optionally comprise of multi-functional monomers such as tri-acids or tri-amines. The presence of multi-functional monomers can be beneficial to the formation of highly branched polymeric structures with a broad MW distribution. Such materials can often show improved cold flow properties as well as improved shear adhesion performance.

The inventive polyamide (co)polymers can optionally comprise of mono-functional monomers such as monoacids or mono-amines. The level of mono-functional monomers is calculated such that the equivalents of acid and amine at the start of the polymerization are approximately equal. The resulting polyamide (co)polymers will be significantly end-capped by the mono-functional monomers and will not possess titratable acid or amine end groups. Such polyamide (co)polymers will not react with other materials, due to the lack of reactive end groups.

In some cases, it is advantageous to include mono-functional monomers when using multi-functional monomers. In such cases, the levels of mono- and multi-functional monomers is preferably selected such that a gel point is not realized during polymerization. Such polyamide (co)polymers may also be more chemically stable when mixed with other components such as rosin ester tackifiers.

In some exemplary embodiments, it may be desirable that the polyamide PSA be crosslinked to obtain excellent high temperature static shear properties, for example at 70° C. or 90° C. or even 120° C.

The inventive polyamide (co)polymers can be optionally combined with plasticizers and tackifiers to enhance their adhesive properties and performance as PSA's under certain conditions.

Various aspects and advantages of exemplary embodiments of the disclosure have been summarized. The above Summary is not intended to describe each illustrated embodiment or every implementation of the present certain exemplary embodiments of the present disclosure. The Detailed Description that follows more particularly exemplifies certain preferred embodiments using the principles disclosed herein.

DETAILED DESCRIPTION

For the following Glossary of defined terms, these definitions shall be applied for the entire application, unless a different definition is provided in the claims or elsewhere in the specification.

Glossary

Certain terms are used throughout the description and the claims that, while for the most part are well known, may require some explanation. It should understood that:

The term "aliphatic acid" means a carboxylic acid functional organic compound characterized by the absence of aromatic groups connected directly to the carboxylic acid groups. The carbon atoms that are not carboxylic acid groups can be further substituted with alkyl or aryl chains. An acid group is understood to include carboxylic acid derivates capable of reacting with amines such as acid chlorides or acid esters. For example, it is known that polyamides can be prepared by the reaction of di-acid chlorides and di-amines resulting in the formation of an amide bond and hydrogen chloride as a by-product or by the reaction of diesters and di-amines resulting in the formation of an amide bond and an alcohol as a by-product or by the reaction of anhydrides with di-amines resulting in the formation of an amide bond and one mole of water from each mole of an anhydride.

The term "biodegradable and/or compostable" means the material decomposes with the aid of naturally occurring microorganisms (e.g., biodegrades) into organic matter (e.g., compost), $CO_2$, and water within a time frame consistent with other known compostable material. This requirements for industrial compostability are detailed in ASTM D6400.

The term "homogeneous" means exhibiting only a single phase of matter when observed at a macroscopic scale.

The term "branched monomer" means an acid or amine functional aliphatic monomer that has alkyl, cycloalkyl, alkylene or aryl substituents on an otherwise linear carbon chain in the molecule. In the case of alkylene substituents, these substituents connect with other alkylene substituents in the same molecule to form cyclic groups within the monomer.

The term "mono-acid" means an organic molecule that has one carboxylic acid group.

The term "di-acid" means an organic molecule that has only two covalently attached carboxylic acid groups. It is understood that when prepared a di-acid may contain low levels of mono-acid and tri-acid molecules. The mole-weighted functionality of a di-acid is between 1.97-2.01. For example, a di-acid monomer with 3 mole % mono-acid, 95 mole % di-acid and 2 mole % tri-acid has a mole-weighted functionality of 1.99. Such di-acid monomers are useful for preparing high molecular weight branched amorphous polyamide (co)polymers due to the low level of tri-acid molecules.

The term "tri-acid" means an organic molecule that has only three covalently attached carboxylic acid groups. It is understood that when prepared a tri-acid may contain low levels of mono-acid and di-acid molecules. The mole-weighted functionality of a tri-acid is between 2.5-3.0. For example, a di-acid monomer with 6 mole % mono-acid, 25 mole % di-acid and 69 mole % tri-acid has a mole-weighted functionality of 2.63. Such tri-acid monomers cannot be used for preparing high molecular weight branched amorphous polyamide (co)polymers.

The term "mono-amine" means an organic molecule that has one amine group.

The term "di-amine" means an organic molecule that has only two amine groups and each amine group is independently either a primary amine group (i.e., covalently attached to 2 hydrogen atoms and one carbon atom) or secondary amine group (i.e., covalently attached to 1 hydrogen atom and two carbon atoms). The two amine groups can be covalently connected to each other through one or more carbon atoms. In some cases, the carbon atoms connecting the amine groups can be interrupted by one or more oxygen atoms to form mono- or polyether di-amines. In these cases, the oxygen atoms may be separated by two, three, four or more carbon atoms. In some cases, the carbon atoms connecting the amine groups can be interrupted by one or more nitrogen atoms. In these cases, the interrupting nitrogen atom is tertiary amine, that is it does not have any N—H bonds. The interrupting nitrogen atoms can be separated by two, three, four, or more carbon atoms. In some cases, the carbon atoms connecting the amine groups contain aromatic and cyclic groups. It is understood that when prepared a di-amine may contain low levels of mono-amine and tri-amine molecules. The mole-weighted functionality of a di-amine is between 1.98-2.02. For example, a di-amine monomer with 3 mole % mono-amine, 95 mole % di-amine and 2 mole % tri-amine has a mole-weighted functionality of 1.99. Such di-amine monomers are useful for preparing branched amorphous polyamide (co)polymers.

The term "secondary di-amine" means a di-amine molecule wherein both of the amine groups are secondary amines. Each secondary amine groups can be substituted with alkyl groups or aryl groups. Each secondary amine can also be incorporated in a ring structure.

The term "branched di-amine" means a di-amine molecule in which the carbon atoms connecting the amine groups are substituted with one or more alkyl, alkylene, or aryl groups. The substituent groups can include cyclic groups and the substituent croups can be further substituted with additional alkyl, alkylene, or aryl groups.

The terms "(co)polymer" or "(co)polymers" includes homopolymers and copolymers, as well as homopolymers or copolymers that may be formed in a miscible blend, e.g., by coextrusion or by reaction, including, e.g., transesterification. The term "copolymer" includes random, block and star (e.g., dendritic) copolymers.

The term "homogeneous" means exhibiting only a single phase of matter when observed at a macroscopic scale.

The term "(meth)acryl" with respect to a monomer, oligomer, or (co)polymer means a vinyl-functional alkyl ester formed as the reaction product of an alcohol with an acrylic or a methacrylic acid.

The term "molar equivalent ratio" means the ratio of the amine functional groups to acids functional groups present at the start of the polymerization. For example, a reaction mixture consisting of 60.10 g of ethylene diamine (molecular weight is 60.10 g/mol, 2 amine groups per mol) and 560 g of dimer acid (equivalent weight provided by the manufacturer is 285 g/mol) has 2.0 molar equivalents of ethylene diamine and 1.96 molar equivalents of dimer acid at the start of the reaction. The molar equivalent ratio is therefore 1.02.

The term "telechelic" with respect to a (co)polymer means a polymer or oligomer capable of entering into further polymerization or other reactions through its reactive end groups. (source: *Compendium of Polymer Terminology and Nomenclature—IUPAC Recommendations* 2008—C, International Union of Pure and Applied Chemistry (2009).).

The term "adjoining" with reference to a particular layer means joined with or attached to another layer, in a position wherein the two layers are either next to (i.e., adjacent to) and directly contacting each other, or contiguous with each other but not in direct contact (i.e., there are one or more additional layers intervening between the layers).

By using terms of orientation such as "atop", "on", "over," "covering", "uppermost", "underlying" and the like for the location of various elements in the disclosed coated articles, we refer to the relative position of an element with respect to a horizontally-disposed, upwardly-facing substrate. However, unless otherwise indicated, it is not intended that the substrate or articles should have any particular orientation in space during or after manufacture.

By using the term "overcoated" to describe the position of a layer with respect to a substrate or other element of an article of the present disclosure, we refer to the layer as being atop the substrate or other element, but not necessarily contiguous to either the substrate or the other element.

By using the term "separated by" to describe the position of a layer with respect to other layers, we refer to the layer as being positioned between two other layers but not necessarily contiguous to or adjacent to either layer.

The terms "about" or "approximately" with reference to a numerical value or a shape means+/−five percent of the numerical value or property or characteristic, but expressly includes the exact numerical value. For example, a viscosity of "about" 1 Pa-sec refers to a viscosity from 0.95 to 1.05 Pa-sec, but also expressly includes a viscosity of exactly 1 Pa-sec. Similarly, a perimeter that is "substantially square" is intended to describe a geometric shape having four lateral edges in which each lateral edge has a length which is from 95% to 105% of the length of any other lateral edge, but which also includes a geometric shape in which each lateral edge has exactly the same length.

The term "substantially" with reference to a property or characteristic means that the property or characteristic is exhibited to a greater extent than the opposite of that property or characteristic is exhibited. For example, a substrate that is "substantially" transparent refers to a substrate that transmits more radiation (e.g., visible light) than it fails to transmit (e.g., absorbs and reflects). Thus, a substrate that transmits more than 50% of the visible light incident upon its surface is substantially transparent, but a substrate that transmits 50% or less of the visible light incident upon its surface is not substantially transparent.

As used in this specification and the appended embodiments, the singular forms "a", "an", and "the" include plural referents unless the content clearly dictates otherwise. Thus, for example, reference to fine fibers containing "a compound" includes a mixture of two or more compounds. As used in this specification and the appended embodiments, the term "or" is generally employed in its sense including "and/or" unless the content clearly dictates otherwise.

As used in this specification, the recitation of numerical ranges by endpoints includes all numbers subsumed within that range (e.g., 1 to 5 includes 1, 1.5, 2, 2.75, 3, 3.8, 4, and 5).

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

Exemplary embodiments of the present disclosure may take on various modifications and alterations without departing from the spirit and scope of the present disclosure. Accordingly, it is to be understood that the embodiments of the present disclosure are not to be limited to the following described exemplary embodiments, but is to be controlled by the limitations set forth in the claims and any equivalents thereof.

Various exemplary embodiments of the disclosure will now be described. Exemplary embodiments of the present disclosure may take on various modifications and alterations without departing from the spirit and scope of the disclosure. Accordingly, it is to be understood that the embodiments of the present disclosure are not to be limited to the following described exemplary embodiments but are to be controlled by the limitations set Branched Amorphous Polyamide (Co)Polymers In exemplary embodiments, the disclosure describes branched amorphous polyamide (co)polymers having a backbone formed by reacting a reaction mixture including at least 25 mol % of a di-amine selected from a secondary di-amine, a branched di-amine, or a combination thereof, and an aliphatic acid blend including a branched aliphatic di-acid and a branched aliphatic tri-acid, wherein the molar equivalent ratio of the di-amine to the aliphatic acid blend is 0.9-1.1.

Preferably, the branched amorphous polyamide (co)polymers are not telechelic.

Preferably, the branched amorphous polyamide (co)polymer adheres to itself cohesively, but not adhesively.

In certain presently preferred embodiments, the resulting amorphous polyamide (co)polymers exhibit one or more of the following properties:

a. a shear modulus (G') measured using the Dynamic Mechanical Analysis Test of from 10,000 to 500,000 Pa at 25° C.;

b. a complex viscosity ($\eta^*$) measured using the Dynamic Mechanical Analysis Test of greater than 1,000,000 mPa*s at 70° C.;

c. a glass transition temperature ($T_g$) measured using the Differential Scanning Calorimetry Test of less than 25° C.; or d. a number average molecular weight ($M_n$) measured using the Gel Permeation Chromatography Test of greater than 10,000 Da.

Di-Amine

The branched amorphous polyamide (co)polymers having a backbone formed by reacting a reaction mixture including at least 25 mol % of a di-amine selected from a secondary di-amine, a branched di-amine, or a combination thereof Secondary Di-Amine The secondary di-amine may be selected from the group consisting of piperazine; 1,3-Di-4-piperidylpropane available under the trade designation "DIPIP" from Vertellus Industrial Specialties, Indianapolis, Indiana; a cycloaliphatic bis(secondary amine) available under the trade designation "JEFFLINK 754 DIAMINE" from Huntsman International, LLC, Salt Lake City, Utah; an aliphatic secondary di-amine available under the trade designation "CLEARLINK 1000" from Dorf Ketal, Houston, Texas; a polyether secondary di-amine available under the trade designation "JEFFAM-INE SD-231" from Huntsman, The Woodlands, Texas; a polyether secondary di-amine available under the trade designation "JEFFAMINE SD-401" from Huntsman, The Woodlands, Texas and a polyether secondary di-amine available under the trade designation "JEFFAMINE SD-2001" from Huntsman, The Woodlands, Texas, and combinations thereof.

Branched Di-Amine

The branched di-amine may be selected from the group consisting of 1,2-propylene di-amine; 2,2,4(2,4,4)-trimethylhexamethylene-1,6-di-amine available under the trade designation "VESTAMIN TMD" from Evonik (Marl, Germany); isophorone di-amine available under the trade designation "VESTAMIN IPD" from Evonik (Marl, Germany); an aliphatic branched di-amine with ether linkages available under the trade designation "JEFFAMINE RFD-270" from Huntsman (The Woodlands, Texas); 2-methylpentane-1,5-di-amine, an aliphatic secondary di-amine available under the trade designation "DYTEK A" from Invista (Wilmington, DE) and 1,3-pentanedi-amine, an aliphatic secondary di-amine available under the trade designation "DYTEK EP" from Invista (Wilmington, DE); and combinations thereof.

It is understood that a branched di-amine that reacts with di-acids is comprised of 2 nitrogen atoms, each of which have either one or two N—H bonds on each nitrogen atom. For example, while N,N-diethyl ethylenedi-amine is a di-amine, only one nitrogen atom has N—H bonds whereas the other is disubstituted with ethyl groups. As a result, N,N-diethyl ethylenedi-amine is considered a mono-amine as far as reactivity is concerned.

Another example, 3,3'-diamino-N-methyldipropylamine, has three nitrogen atoms, but only two are substituted with two N—H bonds each and the third nitrogen atom has no N—H bonds. As a result, 3,3'-diamino-N-methyldipropylamine is considered a branched di-amine rather than a tri-amine.

The branched amorphous (co)polyamide may also comprise low levels of hybrid primary-secondary di-amines. Such hybrid primary-secondary di-amines are present at low levels, e.g., <25 mol %, preferably <20 mol %, more preferably <15 mol % of the total di-amine composition. Suitable examples of hybrid di-amines include 2-amino-ethyl-piperazine, N-isopropyl-1,3-propane di-amine, N-methylethylenedi-amine, N-methyl-1,6-hexane di-amine, $N^2$,2-dimethyl-1,2-propane di-amine, $N^1$-methyl-1,3-butane di-amine, and combinations thereof.

The branched amorphous (co)polyamide may further comprise low levels of primary di-amines. Such monomers contribute to hydrogen bonding in the polyamide and can cause stiffening of the polyamide resulting in loss of PSA properties. The primary di-amines are generally limited to <15 mol %, preferably <10 mol %, even more preferably <5 mol %.

Examples of primary di-amines are ethylene di-amine, hexamethylene di-amine, decamethylene di-amine, 1,2-di-aminocyclohexane, 2,3-norbornanedi-amine, 1,3-diamino-adamantane, 2,2'-oxybis(ethylamine), 1,3-phenylenedi-amine, 1,4-phenylenedi-amine, 1,3-bis(aminomethyl) benzene, and combinations thereof.

The branched amorphous (co)polyamide may further comprise low levels of linear or aromatic di-acid monomers. Such monomers contribute to hydrogen bonding in the polyamide and can cause stiffening of the polyamide resulting in loss of PSA properties. The primary di-amines are limited to <15 mol %, preferably <10 mol %, even more preferably <5 mol %. Examples of such di-acid monomers include adipic acid, sebacic acid, dodecanedioic acid, octa-decanedioic acid, terephthalic acid, 2,6-naphthalene dicar-boxylic acid, 1,4-naphthalene dicarboxylic acid, and combinations thereof.

Aliphatic Acid Blend

The branched amorphous polyamide (co)polymers having a backbone formed by reacting a reaction mixture including at least 25 mol % of a di-amine selected from a secondary di-amine, a branched di-amine, or a combination thereof, and an aliphatic acid blend including a branched aliphatic di-acid and a branched aliphatic tri-acid.

Branched aliphatic di-acids and branched aliphatic tri-acids can be advantageously used to make high molecular weight branched (branched) amorphous polyamide (co)polymers within a molar equivalent ratio of 0.9-1.1. For example, a mixture of a dimer acid with 9% mono-acid, 73% di-acid, 18% tri-acid with another dimer acid with 3% mono-acid, 95% di-acid and 2% tri-acid can be used to prepare an aliphatic acid blend including a branched aliphatic di-acid and a branched aliphatic tri-acid.

Branched Aliphatic Di-Acid

Suitable di-acids useful in making branched amorphous polyamide (co)polymers are disclosed in U.S. Pat. Pub. No. 2018/0305544, the entire disclosure of which is incorporated herein by reference. The branched aliphatic di-acid may be selected from the group consisting of 2-propylmalonic acid; 2,2-dimethylmalonic acid; 2,2-diethylmalonic acid; 2,3-di-methylsuccinic acid; dimer acid obtained under the trade designation PRIPOL 1013 from Croda, Inc. (Edison, NJ); dimer acid obtained under the trade designation PRIPOL 1017 from Croda, Inc. (Edison, NJ) and containing 16% triacid content and which cannot be used to prepare linear branched amorphous polyamide (co)polymers without gela-tion when using molar equivalent ratio of 0.9-1.1; dimer acid obtained under the trade designation UNIDYME 14 from Kraton (Houston, TX); dimer acid obtained under the trade designation FLORADYME 1100 from Florachem (Jackson-ville, FL); and combinations thereof.

Other aliphatic branched di-acids such as 2-propylma-lonic acid; 2,2-dimethylmalonic acid; 2,2-diethylmalonic acid; and 2,3-dimethylsuccinic acid may be present as a minor component (e.g., <25 mol %) of the total moles of di-acid.

U.S. Pat. Pub. No. 2018/0305544, the entire disclosure of which is incorporated herein by reference, discloses other linear di-acids and di-amines useful as minor components (e.g., <25 mol %) of the total moles of di-acid) such that these monomers do not introduce excessive hydrogen bond-ing that adversely affects the performance of the branched amorphous polyamide (co)polymer as a PSA.

Branched Aliphatic Tri-Acid

The branched aliphatic tri-acid may be selected from the group consisting of citric acid; nitrilotriacetic acid; trimer acid obtained under the trade designation PRIPOL 1040 from Croda, Inc. (Edison, NJ); trimer acid obtained under the trade designation UNIDYME 40 from Kraton (Houston, TX); trimer acid obtained under the trade designation UNIDYME 60 from Kraton (Houston, TX); trimer acid obtained under the trade designation FLORADYME 6500 from Florachem (Jacksonville, FL); and combinations thereof.

Optional End-Capping Groups

In some exemplary embodiments, the branched amorphous polyamide (co)polymer may advantageously comprise one or more alkyl-substituted mono-functional end-capping groups selected from acid functional or amine functional end-capping groups. Examples of suitable mono-acids include oleic acid, linoleic acid, octanoic acid, 2-ethylhexanoic acid, dodecanoic acid, stearic acid. Examples of suitable mono-amines include octylamine, 2-ethylhexylamine, dodecylamine, oleylamine, stearylamine, and combinations thereof.

End-capping (terminating) groups may be advantageously incorporated into the branched amorphous polyamide (co) polymers used as pressure sensitive adhesives including a tackifier as described further below. In some exemplary embodiments, incorporation of a selected amount of end-capping (terminating) groups (e.g., 0.1 equivalent of mono-acid with 0.1 excess amine (e.g., oleic acid; linoleic acid; octanoic acid; 2-ethylhexanoic acid; dodecanoic acid; stearic acid; and combinations thereof) if amine-terminated; 0.1 equivalent of mono-amine (e.g., octylamine; 2-ethylhexylamine; dodecylamine; oleylamine; stearylamine; N,N-diethylethylenedi-amine; and combinations thereof) if acid-terminated).

In other exemplary embodiments, the branched amorphous polyamide (co)polymer may advantageously comprise one or more alkyl-substituted mono-functional end-capping groups selected from acid-functional end-capping groups selected from the group consisting of oleic acid, linoleic acid, octanoic acid, 2-ethylhexanoic acid, and combinations thereof.

In further exemplary embodiments, the branched amorphous polyamide (co)polymer may advantageously comprise one or more alkyl-substituted mono-functional end-capping groups selected from amine-functional end-capping groups selected from the group consisting of 2-ethylhexyl amine, dodecyl amine, oleyl amine, and combinations thereof.

Optional Branching Agents

In some exemplary embodiments, the branched amorphous polyamide (co)polymer may advantageously comprise a branching agent used to replace a portion of the dimer acid, wherein the branching agent reacts to form the backbone of the (co)polymer. The optional branching agent may be selected from the group consisting of certain di-acids with high tri-acid content, tri-acids and tri-amines.

Optional Di-Acid Branching Agents

In certain exemplary embodiments, the optional branching agent is a di-acid with high content of tri-functional trimer acid (tri-acid). The di-acid with high content of tri-functional trimer acid may be selected from the group consisting of dimer acid obtained under the trade designation PRIPOL 1017 from Croda, Inc. (Edison, NJ) containing 16% triacid content; dimer acid obtained under the trade designation UNIDYME 18 from Kraton (Houston, TX) containing 16.5% triacid content.

Optional Tri-Acid Branching Agents

In certain exemplary embodiments, the optional branching agent is a tri-functional trimer acid (tri-acid). The tri-functional trimer acid may be selected from the group consisting of citric acid; nitrilotriacetic acid; dimer acid obtained under the trade designation PRIPOL 1017 from Croda, Inc. (Edison, NJ) containing 16% triacid content and which cannot be used to prepare linear branched amorphous polyamide (co)polymers without gelation when using amine/acid molar ratios of 0.9-1.1; trimer acid obtained under the trade designation PRIPOL 1040 from Croda, Inc. (Edison, NJ); trimer acid obtained under the trade designation UNIDYME 40 from Kraton (Houston, TX), trimer acid obtained under the trade designation UNIDYME 60 from Kraton (Houston, TX); trimer acid obtained under the trade designation FLORADYME 6500 from Florachem (Jacksonville, FL); and combinations thereof.

In other exemplary embodiments, the optional branching agent is a tri-functional amine (tri-amine). Suitable tri-functional amines may be selected from diethylene triamine, tris(2-aminoethyl)amine, 1,3,5-triaminobenzene, 1,2,4-triaminobenzene, tris(3-aminopropyl)amine, 1,2,3-propane tri-amine, 3,3'-diaminodipropylamine, and combinations thereof.

Optional Multi-Functional Monomers

In some exemplary embodiments, the branched amorphous polyamide (co)polymer may advantageously comprise at least one multi-functional monomer such as a tri-acid or tri-amine. The presence of multi-functional monomers can be beneficial to the formation of highly branched polymeric structures with a broad MW distribution. Such materials can often show improved cold flow properties as well as improved shear adhesion performance.

Examples of suitable tri-acids include dimer acid grades with approximately 80% di-acid, 16% tri-acid and 4% monoacid such as PRIPOL 1017, obtained from Croda, Inc. (Edison, NJ); 1,3,5-benzenetricarboxylic acid; 1,2,4-benzenetricarboxylic acid; and combinations thereof.

Examples of suitable tri-amines include diethylene triamine; tris(2-aminoethyl)amine; 1,3,5-triaminobenzene; 1,2,4-triaminobenzene; tris(3-aminopropyl)amine; 1,2,3-propanetri-amine; 3,3'-diaminodipropylamine; and combinations thereof.

When using multi-functional monomers, care must be taken that the branched amorphous polyamide (co)polymer does not attain the gel point. This is readily achieved through reasonable experimentation or through the use of Flory gel theory calculations. Under the Flory gel theory calculations, the probability of gelation for a given polyamide composition containing multi-functional monomers can be calculated using Equation (2) on page 351 in Chapter 9 of "Principles of Polymer Chemistry" by Paul Flory, 1953 (Cornell University Press, Ithaca).

These calculations assume that all A and B groups have equal reactivity and that reactivity is not altered when one A group on a molecule has reacted with a B group. The calculation neglects the effect of cyclization, which Flory estimated is low enough as to not affect the general conclusion. Equation (2) in the Flory reference, shown below, calculates the probability, a, that a functional group A on a branching agent unit is connected to another functional group A on another branching agent unit A can only react with B and it is assumed that no intramolecular cyclization is occurring:

$$\alpha = r p A^2 \rho / [1 - r p A^2 (1 - \rho)]$$

where r is the ratio of A to B groups (equivalents) present initially such that $0 < r \leq 1$ with B groups being in excess, pA is the extent of reaction of all A groups such that $0 \leq pA \leq 1$ and $\rho$ is the ratio of A groups (equivalents) belonging to branching agents relative to all A groups (equivalents).

As an example, if r=0.96, pA=0.99 and ρ=0.08, then α=0.56. In this case, the polyamide composition is expected to form a gel since the probability α≥0.5. When the probability of a branch unit forming a chain to another branch unit, α≥0.5, the formation of an infinite network is expected. The formation of an infinite network can be prevented in this case, by decreasing the r ratio to 0.94 or by introducing mono-functional A groups that can act as chain terminators. If σ represents the ratio of A groups (equivalents) belonging to mono-functional units relative to all A groups (equivalents), then the probability, α, that a functional group A on a branching agent unit is connected to another functional group A on another branching agent unit is given by:

$$\alpha = rpA^2\rho/[1-rpA^2(1-\rho-\sigma)]$$

If r=0.96, pA=0.99, ρ=0.08 and σ=0.03, then α=0.46, demonstrating the utility of mono-functional units in preventing gelation. With the Flory formula and experimentation, it is possible to develop branched polyamide compositions that are terminated in mono-functional units.

Optional Mono-Functional Monomers

The branched amorphous polyamide (co)polymers can optionally comprise mono-functional monomers such as mono-acids or mono-amines. The level of mono-functional monomers is calculated such that the equivalents of acid and amine at the start of the polymerization are approximately equal. The resulting amorphous polyamide (co)polymers will be significantly terminated or end-capped by the mono-functional monomers and thus will not possess titratable acid or amine end groups. Such branched amorphous polyamide (co)polymers will not react with other materials due to the lack of reactive end groups.

However, in some embodiments, it is advantageous to include mono-functional monomers, particularly when using multi-functional monomers. In such cases, the levels of mono- and/or multi-functional monomers is selected such that a gel point is not realized during polymerization. Such branched amorphous polyamide (co)polymers may also be more chemically stable when mixed with other components such as rosin ester tackifiers.

The level of monofunctional monomers is generally calculated such that the equivalents of acid and amine at the start of the polymerization are approximately equal. The resulting polyamide (co)polymers will be significantly terminated by the monofunctional monomers and will not possess titratable acid or amine end groups. Such polyamide (co)polym will not react with other materials due to the lack of reactive end groups.

In some exemplary embodiments, the branched amorphous polyamide (co)polymer comprises one or more alkyl-substituted mono-functional end-capping groups selected from acid functional or amine functional end-capping groups.

Examples of suitable mono-acids include oleic acid, linoleic acid, octanoic acid, 2-ethylhexanoic acid, dodecanoic acid, stearic acid, and combinations thereof.

Examples of suitable mono-amines include octylamine, 2-ethylhexylamine, dodecylamine, oleylamine, stearylamine, N,N-diethylethylenedi-amine, and combinations thereof.

Optional Ethylenically Unsaturated Monomers

In some exemplary embodiments, the reaction mixture may further comprise an ethylenically unsaturated monomer, reacted to form the branched amorphous polyamide (co)polymer. In general, incorporation of ethylenically unsaturated monomers in the reaction mixture and/or the branched amorphous polyamide (co)polymer may act to diminish or prevent hydrogen bonding. In such cases, secondary amines and/or branched primary di-amines with one or more methyl groups attached to the di-amine may be advantageously included in the reaction mixture and/or the branched amorphous polyamide (co)polymer to provide steric hindrance to reduce or prevent hydrogen-bonding In some exemplary embodiments, incorporation of a small amount (e.g., ≤2 wt. %, ≤1.5 wt. %, or even ≤1%) of ethylenically unsaturated monomer e.g., tri-(meth)acrylate) in the reaction mixture and/or the branched amorphous polyamide (co)polymer may advantageously facilitate radiation curing to crosslink the polyamide (co)polymer and reduce or eliminate cold flow problems, particularly when the polyamide (co)polymer is used as a PSA.

In certain presently-preferred exemplary embodiments, the ethylenically unsaturated monomer may be present in the reaction mixture and/or the branched amorphous polyamide (co)polymer at less than 2.5 wt. % based on the weight of the reaction mixture, and/or at less than 2.5 wt. % of the branched amorphous polyamide (co)polymer.

Optional Cross-Linking Monomers

In some embodiments, it is preferred that the branched amorphous polyamide (co)polymer should have excellent high temperature static shear properties, for example at 70° C. or 90° C. or even 120° C. To obtain such properties it is generally necessary to cross-link the amorphous polyamide (co)polymer. Cross-linking is generally preferred in certain applications with high temperature requirements such as high-performance foam PSA tapes require cross-linking to pass 90° C. static shear testing. While cross-linking can be achieved by thermal or radiation curing of a branched amorphous polyamide (co)polymer made with ethylenically unsaturated monomers such as dimer acid, the efficiency of free radical cross-linking is not particularly high due to the internal location of the unsaturation.

Thus, in some exemplary embodiments, the reaction mixture advantageously includes an ethylenically unsaturated crosslinkable monomer selected from the group consisting of multi-functional ethylenically unsaturated esters of (meth)acrylic acid with polyhydric alcohols including, for example, the diacrylic acid and dimethylacrylic acid ester of aliphatic diols such as ethyleneglycol, triethyleneglycol, 2,2-dimethyl-1,3-propanediol, 1,3-cyclopentanediol, 1-ethoxy-2,3-propanediol, 2-methyl-2,4-pentanediol, 1,4-cyclohexanediol, 1,6-hexamethylenediol, 1,2-cyclohexanediol, 1,6-cyclohexanedimethanol, and combinations thereof, the triacrylic acid and trimethacrylic acid esters of aliphatic triols such as glycerin, 1,2,3-propanetrimethanol, 1,2,4-butanetriol, 1,2,5-pentanetriol, 1,3,6,-hexanetriol, 1,5,10-decanetriol, and combinations thereof, the triacrylic acid and trimethacrylic acid esters of tris(hydroxyethyl)-isocyanurate, and combinations thereof, the tetraacrylic and tetramethacrylic acid esters of aliphatic tetraols, such as 1,2,3,4-butanetetrol, 1,1,2,2,-tetramethylolethane, 1,1,3,3,-tetramethylolpropane, pentaerythritol, and combinations thereof, the pentacrylic acid and pentamethacrylic acid esters of aliphatic pentols such as adonitol, and combinations thereof, the hexacrylic acid and hexamethacrylic acid esters of hexanols such as sorbitol, dipentaerythritol, and combinations thereof, the diacrylic acid and dimethacrylic acid esters of aromatic diols such as resorcinol, pyrocatechol, bisphenol A, bis(2-hydroxyethyl) phthalate, and combinations thereof, the trimethacrylic acid ester of aromatic triols such as pyrogallol, phloroglucinol, 2-phenyl-2,2-methylethanol, and combinations thereof, and combinations thereof.

Pressure Sensitive Adhesives

The branched amorphous polyamide (co)polymers may be useful as adhesives alone or in mixtures with other components. Such branched amorphous polyamide (co) polymers and/or mixtures may be used advantageously as pressure sensitive adhesives (PSAs). A widely accepted quantitative description of a pressure sensitive adhesive is provided by the Dahlquist criterion, which defines pressure sensitive adhesives as those materials having a storage modulus (G') of less than about $1.0 \times 10^5$ Pascals (measured at room temperature, 25° C.), while materials having a G' in excess of this value are generally not considered PSA's. Performance as a PSA may be particularly important for "press and seal" adhesive packaging applications.

Thus, in further exemplary embodiments, the disclosure describes branched amorphous polyamide (co)polymers and pressure sensitive adhesive (PSA) compositions derived from such (co)polymers. To synthesize branched amorphous polyamide (co)polymers that can act as PSAs, one or more of the following criteria should preferably be satisfied:

1) presence in the reaction mixture of di-acid monomers at 25 mol % or higher incorporated into the backbone of the branched amorphous polyamide (co)polymers, wherein the di-acid monomers inhibit associative phenomena such as crystallization and hydrogen bonding through the use of:
   a. branched aliphatic di-acids (e.g., dimer acid);
   b. branched aliphatic di-amines (e.g., 1,2-propylene di-amine; 2,2,4-(2,4,4)-trimethyl-1,6-hexamethylene di-amine, and combinations thereof);
   c. polyether di-amines at <15 wt % (e.g., Jeffamine™ ED-2003 obtained from Huntsman Corporation (The Woodlands, TX); Jeffamine™ EDR-148 obtained from Huntsman Corporation (The Woodlands, TX); Jeffamine™ THF-170 obtained from Huntsman Corporation (The Woodlands, TX); 4,7,10-trioxatridecane-1,13-di-amine obtained from BASF Corporation (Ludwigshafen, Germany); and combinations thereof);
   d. ortho- or meta-substituted aromatic di-acids (e.g., phthalic acid, isophthalic acid, and combinations thereof);
2) presence in the reaction mixture of secondary di-amine monomers at 25 mol % or higher incorporated into the backbone of the branched amorphous polyamide (co) polymers, resulting in the formation of tertiary amides (e.g., piperazine) that cannot act as hydrogen bond donors.

While not wishing to be bound by any particular theory, we have discovered that by addition of small quantities (e.g., <1 wt %) of multi-functional (meth)acrylates such as Sartomer SR519HP, available from Arkema (King of Prussia, PA), results in a amorphous polyamide (co)polymer PSA composition that is efficiently crosslinked with radiation sources such as e-beam or UV. Such crosslinked amorphous polyamide (co)polymer PSA compositions provide very good static shear adhesion properties particularly when combined with increased levels of branching that is obtained via trifunctional monomers.

Optional Additives

The branched amorphous polyamide (co)polymers can be optionally combined with one or more additives to enhance or modify their adhesive properties under certain desired conditions. Suitable additives include, but are not limited to, a tackifier; a rheology modifier; a plasticizer; a polyamide (co)polymer having a glass transition temperature ($T_g$) measured using the Differential Scanning Calorimetry Test of at least 25° C.; or a combination thereof.

Optional Tackifiers

The branched amorphous polyamide (co)polymers can be optionally combined with additives such as tackifiers or plasticizers to enhance their adhesive properties under certain conditions.

It is generally accepted that a PSA has a modulus of 10,000-100,000 Pa according to the Dahlquist criterion. Thus, a branched amorphous polyamide (co)polymer with a 300,000 Pa modulus will therefore not be a traditional PSA according to the Dahlquist criterion. However, by the use of appropriate levels of additives such as tackifiers and/or plasticizers, the branched amorphous polyamide (co)polymer may be useful as a PSA. For example, the use of 40 wt % Sylvatac RE 25 obtained from Kraton (Houston, TX) liquid tackifier can turn an amorphous polyamide (co) polymer with a shear storage modulus of 300,000 Pa into a PSA with a shear storage modulus as low as 30,000 Pa.

Thus, in some exemplary embodiments, the branched amorphous polyamide (co)polymer may be combined in a mixture with a tackifier. Suitable tackifiers and plasticizers are disclosed in U.S. Pat. No. 5,795,834 and Pub. U.S. Pat. App. No. 2018/0327638 A1, the entire disclosures of which are incorporated by reference.

In certain embodiments, the tackifier may be selected from the group consisting of rosins such as FORAL™ 85, a stabilized rosin ester from DRT (Rincon, GA) and FORAL™ 85-E from Eastman Chemical (Kingport, TN); the tall oil rosins sold under the trade name SYLVATAC™ series of rom Kraton (Houston, TX); synthetic hydrocarbon resins sold under the trade name ESCOREZ™ by Exxon-Mobil (Houston, TX); tackifiers sold under the trade name WINGTACK™ by Cray Valley (Paris, France); terpene resins such as those sold under the trade name SYLVA-RES™ by Kraton (Houston, TX); and liquid rubbers sold under the trade name OPPANOL® by BASF (Ludwigshafen, Germany); and combinations thereof.

Presently preferred tackifiers for biodegradability and compostability may be selected from the group consisting of rosins such as FORAL™ 85, a stabilized rosin ester from Eastman Chemical (Kingport, TN), the SYLVATAC™ series of tall oil rosins from Kraton (Houston, TX); terpene resins such as the SYLVARES™ from Kraton (Houston, TX); and combinations thereof.

Optional Plasticizers

In some exemplary embodiments, it may be advantageous to combine the branched amorphous polyamide (co)polymer with one or more plasticizer. Suitable plasticizers include a mixture of N-ethyl-4-methylphenylsulfonamide and N-ethyl-2-methylphenylsulfonamide; N-hexyl-4-methylbenzenesulfonamide; N-octyl-4-methylbenzenesulfonamide; N-decyl-4-methylbenzenesulfonamide; N-ethyl-3-methylbenzenesulfonamide; 2-methyl-N-propylbenzenesulfonamide; and combinations thereof.

Optional Rheology Modifiers:

In some exemplary embodiments, it may be advantageous to combine the branched amorphous polyamide (co)polymer with one or more rheology modifiers. Such modifiers may be used to prevent cold flow in the pressure sensitive compositions. Examples of suitable rheology modifiers are dimer acid based polyamides with softening points above 75° C. available under the trade designation UNI-REZ from Kraton (Houston, TX); dimer acid based polyamides with softening points above 75° C. available under the trade designation TECHNOMELT from Henkel (Dusseldorf, Germany); dimer acid polyamide resin available under the trade designation HJ2000 from Shandong Huijin Chemical Co., Ltd. (Dongying, China); thermoplastic polyurethanes available under the trade designation DESMOPAN from Covestro AG (Leverkusen, Germany); ethylene-co-acrylic acid copolymers available under the trade designation A-C from Honeywell International, Inc. (Morristown, NJ).

Presently preferred rheology modifiers for biodegradability and/or compostability are selected from the group consisting of dimer acid based polyamides with softening points above 75° C. available under the trade designation UNI-REZ from Kraton (Houston, TX); dimer acid based polyamides with softening points above 75° C. available under the trade designation TECHNOMELT from Henkel (Dusseldorf, Germany); dimer acid polyamide resin available under the trade designation HJ2000 from Shandong Huijin Chemical Co., Ltd. (Dongying, China).

Optional Photoinitiators

In some exemplary embodiments, it may be advantageous for the branched amorphous polyamide (co)polymers to be radiation curable, for example, by exposure to a source of actinic radiation such as ultraviolet, visible, or infrared light, or a source of ionizing radiation such as an electron beam, gamma radiation source, and the like. For curing by actinic radiation, a photoinitiator is generally a preferred additive to the branched amorphous polyamide (co)polymer.

Suitable photoinitiators are described in U.S. Pat. No. 7,459,489 B2, the entire disclosure of which is incorporated herein by reference. Examples of suitable photoinitiators are those available under the trade designations IRGACURE and DAROCUR from Ciba Specialty Chemical Corp., Tarrytown, N.Y. and include 1-hydroxy cyclohexyl phenyl ketone (IRGACURE 184), 2,2-dimethoxy-1,2-diphenylethan-1-one (IRGACURE 651), bis(2,4,6-trimethylbenzoyl) phenylphosphineoxide (IRGACURE 819), 1-[4-(2-hydroxyethoxy)phenyl]-2-hydroxy-2-methyl-1-propane-1-one (IRGACURE 2959), 2-benzyl-2-dimethylamino-1-(4-morpholinophenyl)butanone (IRGACURE 369), 2-methyl-1-[4-(methylthio)phenyl]-2-morpholinopropan-1-one (IRGACURE 907), and 2-hydroxy-2-methyl-1-phenyl propan-1-one (DAROCUR 1173).

The operation of the present disclosure will be further described with regard to the following detailed examples. These examples are offered to further illustrate the various specific and preferred embodiments and techniques. It should be understood, however, that many variations and modifications may be made while remaining within the scope of the present disclosure.

EXAMPLES

These Examples are merely for illustrative purposes and are not meant to be overly limiting on the scope of the appended claims. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

Summary of Materials

Unless otherwise noted, all parts, percentages, ratios, etc. in the Examples and the rest of the specification are by weight. Solvents and other reagents used may be obtained from Alfa-Aesar (Haverhill, MA) unless otherwise noted. In addition, Table 1 below provides abbreviations and a source for all materials used in the Examples below.

TABLE 1

| Materials | |
| --- | --- |
| Material Designation | Material Description (Source) |
| PRIPOL 1013 | Branched dimer fatty acid, 283-289 g/equivalent; dimer acid:trimer acid molar ratio of 97:3 (obtained from Croda Inc., Edison, NJ) |
| PRIPOL 1040 | Branched trimer fatty acid, 289-305 g/equivalent; dimer acid:trimer acid molar ratio of 22:78 (obtained from Croda Inc., Edison, NJ) |
| PRIPOL 1017 | Branched dimer fatty acid, 285-295 g/equivalent; monomer acid:dimer acid:trimer acid molar ratio of 2:78:20 (obtained from Croda Inc., Edison, NJ) |
| Phthalic Anhydride | Phthalic anhydride, source of phthalic acid (obtained from Alfa-Aesar, Haverhill, MA) |
| Adipic Acid | Adipic Acid (obtained from Sigma-Aldrich, St. Louis, MO) |
| Piperazine | Piperazine (obtained from Alfa-Aesar, Haverhill, MA) |
| TTD | 4,7,10-Trioxa-1,13-tridecanedi-amine (obtained from Sigma-Aldrich, St. Louis, MO) |
| HMDA | Hexamethylene di-amine (obtained from Alfa-Aesar, Haverhill, MA) |
| TMD | 2,2,4-(2,4,4)-Trimethyl-1,6-hexamethylene di-amine (obtained from Sigma-Aldrich, St. Louis, MO) |
| Oleic Acid | Oleic acid (obtained from Alfa-Aesar, Haverhill, MA) |
| Phosphoric Acid | 85 wt % Phosphoric acid in water (obtained from Alfa-Aesar, Haverhill, MA) |
| AFE-1520 | XIAMETER AFE-1520 Antifoam Emulsion (obtained from Dow Chemical, Midland, MI) |
| PRIAMINE 1075 | Dimer di-amine, 267-281 g/equivalent (obtained from Croda Inc., Edison, NJ) |
| PRIAMINE 1074 | Dimer di-amine, 265-278 g/equivalent (obtained from Croda Inc., Edison, NJ) |
| 12PDA | 1,2-Propylene di-amine (obtained from Alfa-Aesar, Haverhill, MA) |
| PS30 | NAUGARD PS30 amine antioxidant stabilizer (obtained from Addivant, Danbury, CT) |
| RE25 | Rosin ester tackifier (obtained under the trade designation "SYLVATAC RE 25" from Kraton; Houston, TX) |
| HJ-2000 | Polyamide resin HJ-2000, softening point of 115-125° C. (obtained from Shandong Huijin Chemical Co., Dongying, China) |
| PBS | Polybutylene succinate (obtained under the trade designation "BIOPBS" from PTT MCC Biochem Company; Bangkok, Thailand) |
| IPA | Isopropanol (obtained from Alfa-Aesar, Haverhill, MA) |
| Toluene | Toluene (obtained from Alfa-Aesar, Haverhill, MA) |

Preparation of Nonwoven Webs

A spunbonded nonwoven fiber web was prepared from INGEO Biopolymer 6202D (a thermoplastic, fiber-grade polylactic acid (PLA) polymer obtained from NatureWorks LLC (Minnetonka, MN) according to the general method disclosed in U.S. Pat. No. 3,802,817 (Matsuki). Specifically, the apparatus used to form the spunbond webs included a first station and a second station, with the first station used to create the first nonwoven layer and the second station used to create the second nonwoven layer. Each station included at least an extrusion head, an attenuator and a quenching stream, with both stations sharing a collector surface.

The first station was positioned upstream from the second station, resulting in filaments produced at the first station reaching the collector surface first and forming a first mass of fibers on the collector surface. Filaments from the second station were thus deposited on the surface of the first fiber mass and formed a second mass of fibers thereon.

PLA pellets were melted in an extruder and pumped into the extrusion heads, which included multiple orifices arranged in a regular pattern, e.g., straight line rows. Filaments of fiber-forming liquid were extruded from the extrusion head and conveyed through air-filled space to an attenuator. PLA filaments were in either the core/sheath configuration or were used as monofilaments. For the core/sheath filaments both the core and sheath are made of the same PLA material with a boundary existing between the two PLA layers (core and sheath) of the filament. Quenching streams of air were directed toward extruded filaments to reduce the temperature of, or partially solidify, the extruded filaments.

The filaments passed through the attenuator were deposited onto a generally flat, porous collector surface with a vacuum device positioned below the collector to assist deposition of fibers onto the collector.

The non-woven webs were prepared using the following process. First, PLA/PLA core/sheath filaments were extruded using a single screw extruder at a temperature of 200-230° C. (sheath) and 230° C. (core), then drawn by quench air at 10° C. with flowrates of 23 m³/minute in Zone 1 and 23 m³/minute in Zone 2, to form a PLA/PLA spunbond first composite layer. PLA mono-component filaments were extruded at 230° C. (drawn by a quench air (15° C.) with a flowrate of 12 m³/minute) and laid on the first composite layer to form a dual-layer web. The dual-layer web was then passed through a through-air bonding station where hot air of 110-130° C. was blown on the dual-layer web to thermally bond the web. The web speed was adjusted to obtain a finished web with a nominal basis weight of 30 grams per square meter (gsm).

Preparation of Polybutylene Succinate (PBS) Films

PBS film was prepared by extrusion coating a thin layer of PBS onto both sides of the spunbonded nonwoven web described above. PBS pellets were fed into a 58 mm twin-screw extruder operated at 260° C. The resulting molten resin was fed through a 760 mm drop die at a rate of 22.7 kg/hour to cast a thin film of PBS on one side of the web. The cast film web was then fed into a nip assembly consisting of a plasma coated casting roll (75 roughness average) positioned facing the cast film side and a silicon rubber nip roll (80-85 durometer) positioned facing the nonwoven web side. The web was pressed between the nip rolls with a nip force of about 70 kPa at a line speed of 23 meters/minute. The opposite side of the web was subsequently coated with PBS by repeating the coating method. The PBS film thickness was 25 micrometers on each side.

Test Methods

The following test methods have been used in evaluating some of the Examples:

Differential Scanning Calorimetry Test

The glass transition temperature ($T_g$) of each sample was analyzed using a differential scanning calorimeter, DSC 2500 (TA Instruments, New Castle, DE). Samples (5-9 mg) were hermetically sealed in an aluminum pan, heated from −60 to 200° C. at 10° C./minute, cooled to −60° C. at 10° C./minute, and then heated to 200° C./minute. The $T_g$ was determined during the second heating cycle and was measured as the midpoint temperature of the sigmoidal shift in baseline.

Dynamic Mechanical Analysis Test

Shear modulus (G') and Complex Viscosity were measured using a parallel plate geometry at 1% strain on a Discovery HR-3 rheometer (TA instruments) in an environmental test chamber for temperature control. Samples were loaded between 70-90° C. and then cooled to the testing temperature. Data collection was started after equilibrating at the testing temperature for 3 minutes. Shear modulus was measured at 25° C. and complex viscosity was measured at 70° C.

Gel Permeation Chromatography (GPC) Test

Number average molecular weights ($M_n$) were measured by gel permeation chromatography (GPC) using an Agilent 1260 GPC instrument with a refractive index detector available from Agilent Technologies (Santa Clara, CA) and a PLgel MIXED-B column (300 mm×7.5 mm ID, 10 micron particle size, part number PL1110-6100) also available from Agilent Technologies (Santa Clara, CA).

The column was maintained at v 40° C. and the flow rate was 1.0 mL/minute. The mobile phase was chloroform with 2% triethylamine (volume\volume). All molecular weights were calculated relative to polystyrene standards (Agilent EasiCal PS-1 polystyrene standards, narrow dispersity linear polystyrene, 6.57 E+6 to 580 g/mol) available from Agilent Technologies (Santa Clara, CA). Calculations were performed using Agilent GPC/SEC software.

Each sample (50 mg) was weighed into a vial and 10 mL of a solution of chloroform with 2% triethylamine (volume\volume) was added to the vial. The sample was mixed using a mechanical shaker at low speed for approximately 2 hours. The resulting solution was filtered through a 0.45 micron PTFE syringe filter and a 40 microliter aliquot (injection volume) was analyzed according to the conditions described above. All samples were prepared and analyzed in duplicate.

Peel Adhesion Test

Peel Adhesion Tests were carried out using an IMASS adhesion tester available from Imass Inc. (Hingham, MA). Adhesive samples were tested after equilibrating in a constant temperature and humidity environment (23° C., 50% RH (relative humidity)). Samples were laminated to a clean stainless steel panel by passing a 4.5 lb (about 1 kg) hand-held roller over the length of the sample two times. The peel adhesion was measured immediately after laminating onto the stainless steel panel, with a removal angle of 180 degrees and a peel rate of 12 inches per minute (30.48 cm per minute).

Static Shear Test

Static Shear Tests were carried out by taking a test strip 1.0 inch (2.54 cm) wide and laminating it to a clean stainless steel panel so that the sample covered a 0.5 inch×1 inch (1.27 cm×2.54 cm) area. Samples were laminated to stainless steel by passing a 4.5 lb (about 1 kg) hand-held roller over the length of the sample four times. Adhesive samples were tested after equilibrating in a constant temperature and humidity environment (23° C., 50% RH). A 500 g weight was applied to a weight fixture attached to the end of the film and the time to failure was recorded in minutes.

T-Peel Adhesion Test

Samples for T-peel adhesion testing were prepared by laminating a strip of coated product (1 inch×6 inches) to a strip of PBS film (1 inch×6 inches). Both strips were in contact for the length of the strips (except for a small section located at one end for attachment of the laminate to the instrument). The sample was laminated with two passes of an automated 4.5 lb roller at 24 inches per minute (60.96 cm per minute). Some samples were tested immediately after lamination (initial time point) and other samples were tested after maintaining them on the substrate for 24 hours at constant temperature and humidity (23° C., 50% RH). Each sample was attached to the jaws to MTS CRITERION Universal Test Instrument that was operated at 12 inches per minute (30.48 cm per minute).

Examples of Branched Amorphous Polyamide (Co)Polymer Compositions

The following illustrate Examples illustrate the preparation of various amorphous polyamide (co)polymers and adhesive compositions according to the present disclosure.

Example 1: PA-1

PRIPOL 1013 (624.7 g), phthalic anhydride (40.0 g), piperazine (88.4 g), and TTD (56.5 g) were combined in a flask. Phosphoric acid (0.27 g) and AFE-1520 (0.030 g) were added to the flask and the mixture was heated to 150° C. The ratio of amine functional groups to acid functional groups in the composition of monomers was 0.95:1. The reaction was held at 150° C. for 1 hour and then heated to 225° C. The reaction was held at 225° C. for 16 hours. Vacuum was then applied to the flask (25 mm Hg) and maintained for 1 hour. The vacuum was released with nitrogen addition and the resulting product was collected at 225° C. to provide Polyamide 1 (PA-1) as a clear, yellow tacky material.

Example 2: PA-2

PRIPOL 1013 (542.4 g), phthalic anhydride (75.2 g), piperazine (89.0 g), and hexamethylene di-amine (40.0 g) were combined in a flask. Phosphoric acid (0.27 g) and AFE-1520 (0.030 g) were added to the flask and the mixture was heated to 150° C. The ratio of amine functional groups to acid functional groups in the composition of monomers was 0.95:1. The reaction was held at 150° C. for 1 hour and then heated to 225° C. The reaction was held at 225° C. for 16 hours. Vacuum was then applied to the flask (25 mm Hg) and maintained for 1 hour. The vacuum was released with nitrogen addition and the resulting product was collected at 225° C. to provide Polyamide 2 (PA-2) as a clear, yellow tacky material.

Example 3: PA-3

PRIPOL 1013 (492.2 g), PRIPOL 1040 (14.4 g), phthalic anhydride (32.6 g), and piperazine (90.0 g) were combined in a flask. Phosphoric acid (0.22 g) and AFE-1520 (0.024 g) were added to the flask and the mixture was heated to 150° C. The ratio of amine functional groups to acid functional groups in the composition of monomers was 0.95:1. The reaction was held at 150° C. for 1 hour and then heated to 225° C. The reaction was held at 225° C. for 16 hours. Vacuum was then applied to the flask (25 mm Hg) and maintained for 1 hour. The vacuum was released with nitrogen addition and the resulting product was collected at 225° C. to provide Polyamide 3 (PA-3) as a clear, yellow tacky material.

Example 4: PA-4

PRIPOL 1013 (478.1 g), PRIPOL 1040 (28.8 g), phthalic anhydride (32.6 g), and piperazine (90.0 g) were combined in a flask. Phosphoric acid (0.22 g) and AFE-1520 (0.024 g) were added to the flask and the mixture was heated to 150° C. The ratio of amine functional groups to acid functional groups in the composition of monomers was 0.95:1. The reaction was held at 150° C. for 1 hour and then heated to 225° C. The reaction was held at 225° C. for 16 hours. Vacuum was then applied to the flask (25 mm Hg) and maintained for 1 hour. The vacuum was released with nitrogen addition and the resulting product was collected at 225° C. to provide Polyamide 4 (PA-4) as a clear, yellow tacky material.

Example 5: PA-5

PRIPOL 1013 (537.8 g), PRIPOL 1040 (32.4 g), adipic acid (16.1 g), and piperazine (90.0 g) were combined in a flask. Phosphoric acid (0.24 g) and AFE-1520 (0.025 g) were added to the flask and the mixture was heated to 150° C. The ratio of amine functional groups to acid functional groups in the composition of monomers was 0.95:1. The reaction was held at 150° C. for 1 hour and then heated to 225° C. The reaction was held at 225° C. for 16 hours. Vacuum was then applied to the flask (25 mm Hg) and maintained for 1 hour. The vacuum was released with nitrogen addition and the resulting product was collected at 225° C. to provide Polyamide 5 (PA-5) as a clear, yellow tacky material.

Example 6: PA-6

PRIPOL 1013 (570.4 g), PRIPOL 1040 (34.4 g), and piperazine (85.9 g) were combined in a flask. Phosphoric acid (0.24 g) and AFE-1520 (0.026 g) were added to the flask and the mixture was heated to 150° C. The ratio of amine functional groups to acid functional groups in the composition of monomers was 0.95:1. The reaction was held at 150° C. for 1 hour and then heated to 225° C. The reaction was held at 225° C. for 16 hours. Vacuum was then applied to the flask (25 mm Hg) and maintained for 1 hour. The vacuum was released with nitrogen addition and the resulting product was collected at 225° C. to provide Polyamide 6 (PA-6) as a clear, yellow tacky material.

Example 7: PA-7

PRIPOL 1013 (541.9 g), PRIPOL 1040 (32.6 g), adipic acid (7.7 g), and piperazine (85.9 g) were combined in a flask. Phosphoric acid (0.24 g) and AFE-1520 (0.025 g) were added to the flask and the mixture was heated to 150° C. The ratio of amine functional groups to acid functional groups in the composition of monomers was 0.95:1. The reaction was held at 150° C. for 1 hour and then heated to 225° C. The reaction was held at 225° C. for 16 hours. Vacuum was then applied to the flask (25 mm Hg) and maintained for 1 hour. The vacuum was released with nitrogen addition and the resulting product was collected at 225° C. to provide Polyamide 7 (PA-7) as a clear, yellow tacky material.

Example 8: PA-8

PRIPOL 1013 (587.0 g), oleic acid (15.8 g), TMD (82.9 g), and piperazine (45.2 g) were combined in a flask. Phosphoric acid (0.26 g) and AFE-1520 (0.018 g) were added to the flask and the mixture was heated to 150° C. The ratio of amine functional groups to acid functional groups in the composition of monomers was 1:1. The reaction was held at 150° C. for 1 hour and then heated to 225° C. The reaction was held at 225° C. for 16 hours. Vacuum was then applied to the flask (25 mm Hg) and maintained for 1 hour. The vacuum was released with nitrogen addition and the resulting product was collected at 225° C. to provide Polyamide 8 (PA-8) as a clear, yellow tacky material.

Example 9: PA-9

PRIPOL 1013 (363.0 g), oleic acid (7.9 g), and Priamine 1074 (346.4 g) were combined in a flask. AFE-1520 (0.018 g) was added to the flask and the mixture was heated to 150° C. The ratio of amine functional groups to acid functional groups in the composition of monomers was 1:1. The reaction was held at 150° C. for 1 hour and then heated to 225° C. The reaction was held at 225° C. for 16 hours. Vacuum was then applied to the flask (25 mm Hg) and maintained for 1 hour. The vacuum was released with nitrogen addition and the resulting product was collected at 225° C. to provide Polyamide 9 (PA-9) as a clear, yellow tacky material.

Example 10: PA-10

PRIPOL 1013 (384.6 g), PRIPOL 1017 (191.4 g), adipic acid (7.7 g), and piperazine (85.9 g) were combined in a flask. Phosphoric acid (0.26 g) and AFE-1520 (0.018 g) were added to the flask and the mixture was heated to 150° C. The ratio of amine functional groups to acid functional groups in the composition of monomers was 0.95:1. The reaction was held at 150° C. for 1 hour and then heated to 225° C. The reaction was held at 225° C. for 16 hours. Vacuum was then applied to the flask (25 mm Hg) and maintained for 1 hour. The vacuum was released with nitrogen addition, and the resulting product was collected at 225° C. to provide Polyamide 10 (PA-10) as a clear, yellow tacky material.

Example 11: PA-11

PRIPOL 1013 (690.7 g), 12PDA (43.6 g), and piperazine (50.5 g) were combined in a flask. Phosphoric acid (0.28 g) and AFE-1520 (0.03 g) were added to the flask and the mixture was heated to 150° C. The ratio of amine functional groups to acid functional groups in the composition of monomers was 0.98:1. The reaction was held at 150° C. for 1 hour and then heated to 225° C. The reaction was held at 225° C. for 2 hours. Vacuum was then applied to the flask (25 mm Hg) and maintained for 1 hour. The vacuum was released with nitrogen addition. PS30 (7.1 g) was added to the reaction and the reaction was stirred for 20 minutes. The resulting product was collected at 225° C. to provide Polyamide 11 (PA-11) as a clear, yellow tacky material.

Example 12: PA-12

PRIPOL 1013 (380.0 g) and Priamine 1075 (338.8 g) were combined in a flask. Phosphoric acid (0.25 g) and AFE-1520 (0.03 g) were added to the flask and the mixture was heated to 225° C. The ratio of amine functional groups to acid functional groups in the composition of monomers was 0.95:1. The reaction was held at 225° C. for 0.5 hour. Vacuum was then applied to the flask (25 mm Hg) and maintained for 1 hour. The vacuum was released with nitrogen addition. PS30 (3.5 g) was added to the reaction and the reaction was stirred for 20 minutes. The resulting product was collected at 225° C. to provide Polyamide 12 (PA-12) as a clear, yellow tacky material.

Examples 13a-13i: Physical Properties and Pressure Sensitive Adhesive Testing for Amorphous Amorphous Polyamide (Co)Polymer Compositions (Examples PA-8 to PA-12) Compounded with Tackifiers and Additives In these Examples, the combination of amorphous polyamide (co)polymers and tackifiers with or without additives is disclosed. By using appropriate soluble tackifiers, e.g., RE25 rosin ester, the shear storage modulus of the amorphous polyamide (co)polymers in this disclosure can be reduced significantly. As a result, the shear storage modulus of these compositions is now within the Dahlquist Criterion. However, such compositions may lack high temperature performance, e.g., at 50° C.

To offset this temperature dependence, a cohesive additive such as HJ2000 may be added to the composition. It is desirable that such additives have a minimal effect on the shear storage modulus at room temperature while resisting loss of shear storage modulus at elevated temperatures. The presently preferred cohesive additive is a branched amorphous polyamide (co)polymer-soluble (co)polymer with a shear storage modulus from 100,000 Pa to 20 MPa with less than 30% loss in shear storage modulus from 25° C. to 90° C.

Polymer blends were prepared by mixing components in the respective compositions in a vial at 150° C. on a hot plate, and then cooled to room temperature. The glass transition temperature was determined using the Differential Scanning Calorimetry Test. Shear modulus (G') was determined using the Dynamic Mechanical Analysis Test configured with 25 mm parallel plates. The results are summarized in Table 2.

TABLE 2

| | | | Elastic Modulus G' @ 25° C. and 1 rad/s (Pa) | Complex Viscosity $\eta^*$ @ 70° C. and 1 Hz (mPa*s) |
|---|---|---|---|---|
| Example | Components (wt % Ratio) | $T_g$ (° C.) | | |
| 13a | PA-8 (100) | −10.7 | 216,383 | nt |
| 13b | PA-9/RE25 (60/40) | −23.9 | 41,843 | 986,000 |
| 13c | PA-10 (100) | −14.8 | 186,512 | 5,253,000 |
| 13d | PA-10/RE25 (60/40) | −15.4 | 21,669 | 328,000 |
| 13e | PA-10/RE25/HJ-2000 (54/36/10) | −15.5 | 37,924 | 559,000 |
| 13f | PA-11/RE25 (60/40) | −14.1 | 29,488 | 293,000 |
| 13g | PA-11/RE25 (80/20) | −15.8 | 79,823 | 16,000 |
| 13h | PA-11/RE-25 (95/5) | −13.6 | 146,338 | 2,106,000 |
| 13i | PA-11 (100) | nt | nt | 3,075,000 |

*Physical Properties of Amorphous Polyamide (Co)polymer Pressure Sensitive Adhesive Compositions* nt = not tested

Example 14: Peel Adhesion and Static Shear Tests

Polyamide PSA compositions of Examples 13a, 13b, and 13f were each coated out of a 50 wt % solids mixture in IPA/toluene onto a HOSTAPHAN 3SAB polyester film (2 mil thick, obtained from Mitsubishi Polyester Film Inc. (Greer, SC) and coated on the manufacturer treated surface of the film) using a laboratory knife coater set with a 3 mil wet gap. Each coated product was dried in a forced air oven at 70° C. for 10 minutes. Test strips of 0.5 inch (about 1.4 cm) width were cut to test peel adhesion properties using the Peel Adhesion Test. For each sample tested using the Peel Adhesion Test, the mean value of nine repetitive tests; and the result of the Static Shear Test, are reported in Table 3.

TABLE 3

Adhesion Results for Amorphous Polyamide
(Co)polymer Pressure Sensitive Adhesive Compositions
Example 15: Peel Adhesion and T-Peel Tests

| PSA Composition | Peel Adhesion Stainless Steel | Static Shear to Stainless Steel (minutes) | |
|---|---|---|---|
| Example | (N/cm) | Test 1 | Test 2 |
| 13a | 2.3 | 351.5 | 391.9 |
| 13b | 2.3 | 22.8 | 18.0 |
| 13f | 4.9 | 20.5 | 19.3 |

Polyamide PSA compositions of Examples 13c, 13d, and 13e were each coated out of a 50 wt solids mixture in IPA/toluene onto a surface-treated HOSTAPHAN 3SAB polyester film (2 mil thick, obtained from Mitsubishi Polyester Film (Greer, SC) using a laboratory knife coater at set with a 3 mil (75 micrometer) wet gap. Each coated product was dried in a forced air oven at 70° C. for 20 minutes.

Peel Adhesion and T-peel Adhesion were determined for some Examples using the Peel Adhesion Test and the T-peel Adhesion Test. Peel adhesion test samples were prepared by laminating 1 inch×6 inches (2.54 cm×15.24 cm) strips to stainless steel with two passes of a 4.5 lb (about 2.1 kg)) roller at 24 inches per minute (60.96 cm per minute). Some samples were tested immediately after lamination (initial time point) and other samples were tested after maintaining them on the substrate for 24 hours at constant temperature and humidity (23° C., 50% RH). The results for Peel Adhesion to stainless steel and T-peel Adhesion to PBS film are reported in Table 4.

TABLE 4

Adhesion Results for Polyamide PSA Compositions

| PSA Composition | | Peel Adhesion to Stainless Steel (N/cm) | | T-Peel to PBS (N/cm) | |
|---|---|---|---|---|---|
| Example | | Initial | 24 hours | Initial | 24 hours |
| 13c | Test 1 | 4.4 | 6.5 | 0.3 | 3.3 |
| | Test 2 | 4.5 | 6.5 | 0.3 | 4.6 |
| 13d | Test 1 | 14.0 | 14.8 | 1.9 | 4.3 |
| | Test 2 | 13.4 | 14.1 | 2.0 | 3.3 |
| 13e | Test 1 | 0.7 | 14.7 | 0.5 | 2.8 |

Reference throughout this specification to "one embodiment," "certain embodiments," "one or more embodiments" or "an embodiment," whether or not including the term "exemplary" preceding the term "embodiment," means that a particular feature, structure, material, or characteristic described in connection with the embodiment is included in at least one embodiment of the certain exemplary embodiments of the present disclosure. Thus, the appearances of the phrases such as "in one or more embodiments," "in certain embodiments," "in one embodiment" or "in an embodiment" in various places throughout this specification are not necessarily referring to the same embodiment of the certain exemplary embodiments of the present disclosure. Furthermore, the particular features, structures, materials, or characteristics may be combined in any suitable manner in one or more embodiments.

While the specification has described in detail certain exemplary embodiments, it will be appreciated that those skilled in the art, upon attaining an understanding of the foregoing, may readily conceive of alterations to, variations of, and equivalents to these embodiments. Accordingly, it should be understood that this disclosure is not to be unduly limited to the illustrative embodiments set forth hereinabove. In particular, as used herein, the recitation of numerical ranges by endpoints is intended to include all numbers subsumed within that range (e.g., 1 to 5 includes 1, 1.5, 2, 2.75, 3, 3.80, 4, and 5). In addition, all numbers used herein are assumed to be modified by the term "about."

Furthermore, all publications and patents referenced herein are incorporated by reference in their entirety to the same extent as if each individual publication or patent was specifically and individually indicated to be incorporated by reference.

Various exemplary embodiments have been described. These and other embodiments are within the scope of the following claims.

What is claimed is:

1. A pressure sensitive adhesive comprising a branched amorphous polyamide (co) polymer, wherein the (co) polymer has a backbone formed by reacting a reaction mixture including:

at least 25 mol % of a di-amine based on the reaction mixture, the di-amine selected from the group consisting of a secondary di-amine, a branched di-amine and a combination thereof;

an aliphatic acid blend comprising a branched aliphatic dimer acid and a branched aliphatic trimer acid;

0% to less than 10 mol % of primary di-amines; and

0% to less than 10 mol % of linear or aromatic di-acid monomers, wherein the molar equivalent ratio of the di-amine to the aliphatic acid blend is 0.9-1.1, optionally wherein the branched amorphous polyamide (co)polymer is not telechelic, and wherein the pressure sensitive adhesive has a storage modulus (G') of less than about $1.0 \times 10^5$ Pascals measured at 25° C.

2. The pressure sensitive adhesive of claim 1, wherein the secondary di-amine is selected from the group consisting of piperazine; 1,3-Di-4-piperidylpropane; and combinations thereof.

3. The pressure sensitive adhesive of claim 1, wherein the branched di-amine is selected from the group consisting of 1,2-propylene di-amine; 2,2,4 (2,4,4)-trimethylhexamethylene-1,6-di-amine; isophorone di-amine; 2-methylpentane-1, 5-di-amine 1,3-pentanedi-amine; and combinations thereof.

4. The pressure sensitive adhesive of claim 1, wherein the (co)polymer comprises one or more alkyl-substituted monofunctional end-capping groups selected from acid functional or amine functional end-capping groups.

5. The pressure sensitive adhesive of claim 1, wherein the reaction mixture further comprises acid functional endcapping monomers selected from the group consisting of oleic acid; linoleic acid; octanoic acid; 2-ethylhexanoic acid; dodecanoic acid; stearic acid; and combinations thereof.

6. The pressure sensitive adhesive of claim 1, wherein the reaction mixture further comprises amine functional endcapping monomers selected from the group consisting of octylamine; 2-ethylhexylamine; dodecylamine; oleylamine; stearylamine; and combinations thereof.

7. The pressure sensitive adhesive of claim 1, wherein the reaction mixture further comprises an ethylenically unsaturated monomer.

8. The pressure sensitive adhesive of claim 7, wherein the ethylenically unsaturated monomer is present at less than 2.5 wt. % based on the weight of the reaction mixture.

9. The pressure sensitive adhesive of claim 7, wherein the ethylenically unsaturated monomer is selected from the group consisting of multi-functional ethylenically unsaturated esters of (meth)acrylic acid with polyhydric alcohols; tri(meth)acrylic acid esters of tris(hydroxyethyl)isocyanurate; tetra(meth)acrylic acid esters of aliphatic tetrols; penta (meth)acrylic acid esters of aliphatic pentols hexa(meth) acrylic acid esters of hexanolsdi(meth)acrylic acid esters of aromatic diols; tri(meth)acrylic acid esters of aromatic triols; and combinations thereof.

10. The pressure sensitive adhesive of claim 1, wherein the reaction mixture further comprises a branching agent that reacts to form the branched amorphous polyamide (co) polymer.

11. The pressure sensitive adhesive of claim 10, wherein the branching agent is selected from the group consisting of tri-acids and tri-amines, optionally wherein the tri-acid is selected from the group consisting of; citric acid; nitrilotriacetic acid; 1,3,5-benzenetricaboxylic acid; 1,2,4-benzenetricarboxylic acid; and combinations thereof, and wherein the tri-amine is selected from the group consisting of diethylene tri-amine; tris(2-aminoethyl)amine; 1,3,5-triaminobenzene; 1,2,4-triaminobenzene; tris(3-aminopropyl)amine; 1,2,3-propanetri-amine; 3,3'-diaminodipropylamine; and combinations thereof.

12. The pressure sensitive adhesive of claim 10, wherein the branching agent is a tri-acid.

13. The pressure sensitive adhesive of claim 12, wherein the branching agent is a triacid selected from the group consisting of; citric acid; nitrilotriacetic acid; and combinations thereof.

14. The pressure sensitive adhesive of claim 1, further comprising an additive selected from a tackifier; a rheology modifier; a plasticizer; a polyamide (co) polymer having a glass transition temperature ($T_g$) measured using the Differential Scanning calorimetry Test of at least 25° C.; or a combination thereof.

15. An adhesive article comprising the pressure sensitive adhesive of claim 1, wherein the adhesive article is compostable.

* * * * *